Patented Jan. 5, 1937

2,067,127

UNITED STATES PATENT OFFICE 2,067,127

CONDENSATION PRODUCTS OF THE AZABENZANTHRONE SERIES AND PROCESS OF MAKING THE SAME

Max Albert Kunz, Mannheim, and Gerd Kochendoerfer, Ludwigshafen-on-the-Rhine, Germany, assignors to General Aniline Works, Inc., New York, N. Y., a corporation of Delaware No Drawing. Application March 30, 1933, Serial No. 663,645. In Germany July 22, 1932

6 Claims. (Cl. 260—40)

The present invention relates to new condensation products of the azabenzanthrone series and a process of making same.

We have found that valuable nitrogenous condensation products are obtained by causing compounds which are capable of reacting as acrolein, for example acrolein or its homologues or substitution products, to act in an acid medium on pyridinonaphthalenes which contain in the isocyclic rings at least one substituent selected from the group =O and —OH.

In the hydroxypyridinonaphthalenes which may be used as initial materials one carbon atom, in peri-position to the carbon atom to which two hydrogen atoms are attached in the tautomeric ketonic form, should bear no substituent.

Suitable pyridinonaphthalenes containing oxygen are, for example, 3-hydroxy-1-(N)-2-pyridinonaphthalene, 7.8-benzoquinoline-5.6-quinone, 2.3 - phthaloylpyridine (pyranthraquinone) and their substitution products, as for example, those containing hydroxy groups, such as 3-hydroxy-2-(Py)-methyl-1-(N)-2-pyridinonaphthalene or those containing alkoxy, alkyl, aryl, nitro, cyano groups or halogen. As compounds which are capable of reacting as acrolein may be mentioned, for example, glycerine, aldol, crotonaldehyde, cinnamaldehyde and similar compounds. It is preferable to work in a sulphuric acid solution, but other strong acids, as for example, hydrochloric acid, are suitable for the condensation. The reaction temperature is usually about 100° C. or up to 160° C.; higher temperatures may, however, be used also.

Depending on the nature of the initial material, it may be preferable for the purpose of obtaining good yields to add to the reaction mixture oxidizing agents (in cases when employing pyridinonaphthalenes containing hydroxy groups) or reducing agents (in cases when employing pyridinonaphthalenes containing the quinone grouping). The reaction products, which are in most cases readily crystallizable compounds, are probably isologues of benzanthrone. The preparation of the initial materials may be carried out in one operation together with the reaction according to the present invention. In this case aminonaphthols suitable for the formation of a pyridino compound are caused to react with glycerine or the like, whereby a pyridino ring is attached thereto and in the same operation the conversion of the pyridino compound thus formed is effected by ring closure according to the present invention.

Valuable products are obtained by introducing substituents according to known methods into the condensation products obtained as described above, which are referred to in the following as "azabenzanthrones."

The following examples will further illustrate the nature of this invention, but the invention is not restricted to these examples. The parts are by weight.

Example 1

50 parts of 3-hydroxy-1-(N)-2-pyridinonaphthalene, 640 parts of 69 per cent sulfuric acid, 70 parts of sodium nitrobenzenesulphonate and 150 parts of 87 per cent glycerine are heated to boiling under a reflux condenser until the boiling point of the mixture has fallen from about 141° to 133° C. The whole is then allowed to cool, the crystalline mass which is deposited is filtered off by suction and washed with dilute sulphuric acid. The filter residue is washed with dilute alkali and a yellowish powder is obtained, which may be crystallized from alcohol or high-percentage acetic acid. It melts at 162° C. and dissolves in dilute mineral acids. According to analysis it has the composition $C_{16}H_9ON$, from which it may be assumed that it has the formula:—

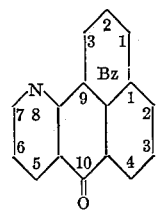

Example 2

55 parts of 3-hydroxy-2-(Py)-methyl-1-(N)-2-pyridinonaphthalene, 640 parts of 69 per cent sulphuric acid, 70 parts of sodium nitrobenzenesulphonate and 150 parts of 87 per cent glycerine are heated at the boiling point for several hours under a reflux condenser. The working up is carried out as described in Example 1. The reaction product has the composition $C_{17}H_{11}ON$ and melts at 159° C. (crystals obtained from acetic acid).

Example 3

25 parts of pyranthraquinone are dissolved in 220 parts of an approximately 70 per cent sulphuric acid and heated to 100° C., after the addition of 65 parts of 70 per cent glycerine.

From 2 to 3 parts of aluminium powder or the equivalent amount of iron powder are then gradually added, the color of the mixture thereupon changing to violet. The whole is boiled for several hours under a reflux condenser and then diluted with 500 parts of water. After cooling, impurities are filtered off by suction, the filtrate is neutralized with alkali and rendered slightly acid with acetic acid. The crude product separating in the form of greenish-yellow flocks is filtered off by suction, boiled with alcohol with an addition of animal charcoal, filtered and water added to the filtrate. The condensation product is thus gradually precipitated in the form of a yellowish powder. It sublimes in the form of yellow needles and dissolves in benzene giving a green fluorescence.

*Example 4*

50 parts of 3.8-dihydroxyl-1-(N)-2-pyridinonaphthalene corresponding to the formula

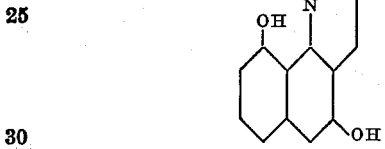

640 parts of 69 per cent sulphuric acid, 150 parts of 87 per cent glycerine and 70 parts of sodium nitrobenzenesulphonate are heated to the boiling point under a reflux condenser for several hours. The whole is diluted with water, impurities are filtered off, and the filtrate rendered alkaline. The precipitate which separates out is filtered off by suction and dried and may be obtained in a crystalline form from an acetic acid of about 65 per cent strength with an addition of a little animal charcoal. The reaction product, which is a hydroxy derivative of the condensation product obtained according to Example 1, probably has the constitution:

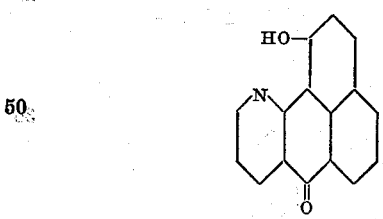

and forms orange yellow crystals which are only slightly soluble in alkali giving an orange-red fluorescence.

Other hydroxy derivatives may be obtained in the same way.

*Example 5*

A mixture of 82 parts of 3.6-dihydroxy-2-benzoquinoline corresponding to the formula

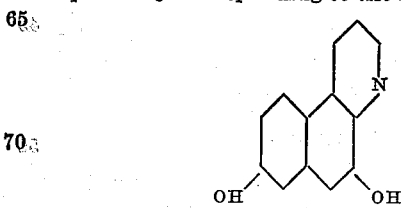

1000 parts of 70 per cent sulphuric acid, 230 parts of 90 per cent glycerine and 110 parts of nitrobenzene sulphonic acid sodium salt are heated for several hours to boiling in a vessel provided with a reflux condenser. Then the mixture is poured into water and an excess of caustic soda solution is added. The mixture is filtered and the reaction is precipitated from the solution by the addition of an acid. The reaction product is filtered off by suction and dried. Probably it is Bz.1-hydroxy-5(N)-1.9-azabenzanthrone corresponding to the formula

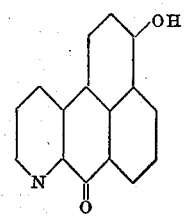

It dissolves in caustic soda solution giving a blue coloration and in concentrated sulphuric acid giving a red coloration and may be recrystallized from organic solvents such as nitrobenzene.

*Example 6*

60 parts of 3-hydroxy-1(N)2-pyridinonaphthalene corresponding to the formula

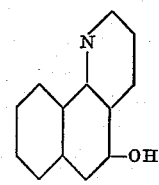

are dissolved in from 700 to 800 parts of 80 per cent sulphuric acid while warming. 100 parts of nitrobenzene sulphonic acid sodium salt are added. As soon as the temperature of 100° to 105° C. is attained, 25 parts of crotonaldehyde are added by and by. Stirring is continued for some time and then the mixture is allowed to cool and poured into an excess of diluted caustic soda solution. A brown amorphous reaction product is precipitated; it is filtered off by suction and dried. It may be purified by treatment with organic solvents. The product dissolves in concentrated sulphuric acid giving the characteristic yellow-green fluorescence of azabenzanthrone.

Instead of crotonaldehyde, the equivalent amount of aldol may be used. If sulphuric acid is substituted by concentrated hydrochloric acid, the same reaction product is obtained.

What we claim is:—

1. The nitrogenous condensation products, azabenzanthrones corresponding to the formula:

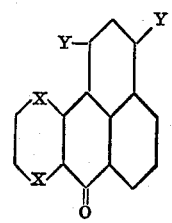

in which one X stands for nitrogen, the other X standing for a CH group, and in which one Y stands for a member of the group consisting of hydrogen and the hydroxy group, the other Y being hydrogen.

2. The nitrogenous condensation product corresponding to the formula

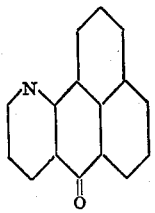

3. The nitrogenous condensation product corresponding to the formula

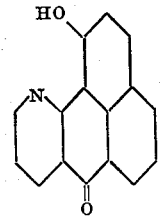

4. The class of nitrogenous condensation products consisting of 5-azabenzanthrones containing hydroxy groups and 8-azabenzanthrones containing hydroxy groups.

5. The nitrogenous condensation product corresponding to the formula:

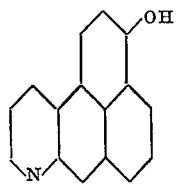

6. The process of producing condensation products of the azabenzanthrone series which comprises heating at temperatures above 90° centigrade a compound corresponding to the general formula:

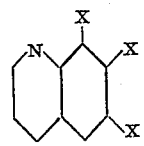

wherein two vicinal X's are carbon atoms of a benzene nucleus, wherein the naphtho nucleus is substituted by at least one of the members of the group consisting of —OH and =O, in sulphuric acid with a compound selected from the class consisting of acrolein and glycerine.

MAX ALBERT KUNZ.
GERD KOCHENDOERFER.